United States Patent

Wasio et al.

[11] Patent Number: 5,289,533
[45] Date of Patent: Feb. 22, 1994

[54] FACSIMILE TRANSMITTING AND RECEIVING APPARATUS

[75] Inventors: Michiyosi Wasio, Shiga; Hiroshi Kuramoto, Takatsuki; Mikiharu Kawahira, Hiroshima, all of Japan

[73] Assignee: Murata Kikai Kabushiki Kaisha, Kyoto, Japan

[21] Appl. No.: 790,194

[22] Filed: Nov. 7, 1991

[30] Foreign Application Priority Data

Nov. 13, 1990 [JP] Japan ............... 2-118974[U]

[51] Int. Cl.⁵ .............................. H04M 11/00
[52] U.S. Cl. ........................ 379/100; 379/94; 379/355
[58] Field of Search ............ 379/100, 93, 94, 96, 379/97, 98, 355, 354, 356, 357; 358/400, 442, 468

[56] References Cited

U.S. PATENT DOCUMENTS

| | | | |
|---|---|---|---|
| 4,113,992 | 9/1978 | Gorham et al. | 379/100 |
| 4,825,465 | 4/1989 | Ryan | 379/100 |
| 4,916,732 | 4/1990 | Kotani et al. | 379/93 |
| 4,939,777 | 7/1990 | Oka | 379/93 |
| 5,018,189 | 5/1991 | Kurosawa et al. | 379/93 |

Primary Examiner—Jin F. Ng
Assistant Examiner—John Chan
Attorney, Agent, or Firm—Spensley Horn Jubas & Lubitz

[57] ABSTRACT

A facsimile transmitting and receiving apparatus comprises a facsimile unit having no single-action or abbreviated dialing function connected to a telephone set which provides an automatic dialing device for transmitting a dial single by the single-action dialing or abbreviated dialing operation and a signal processor for automatically outputting a selection control signal for executing facsimile transmission after call originating operation and operates with a power supply voltage supplied through a telephone line.

5 Claims, 6 Drawing Sheets

FACSIMILE TRANSMITTING AND RECEIVING APPARATUS

BACKGROUND OF THE INVENTION

1 Field of the Invention

The present invention relates to a facsimile transmitting and receiving apparatus which may be connected to a telephone set.

2 Prior Art

In these years, a facsimile transmitting and receiving apparatus (hereinafter referred to as facsimile) for transmitting and receiving image information through a telephone line have been developed and used. Such a facsimile is capable of easily transmitting drawings or designs which cannot be expressed verbally and are used widely in offices.

FIG. 5 shows an appearance of such a facsimile 100. For the facsimile transmission, a transmitting document T is inserted into the document setter 101, the telephone number of called party is inputted with the ten-key 102 and the start key 103 is then depressed. Thereby, the dial signal is transmitted to the telephone line 1 for origination of call. Thereafter, an image signal of transmitting document is transmitted.

However, in the case of a low price facsimile not providing the single-action or abbreviated dialing function for simplifying dial operation, dialing of the telephone number is required for each facsimile transmission, degrading the effectiveness of operation. Accordingly, there exists a need to improve the operability of the facsimile.

Different from such problem, a facsimile having the telephone function has also been developed by adding a handset H to the facsimile 100. However, if supply of power to the facsimile 100 is suspended by power failure, etc., the dialing operation of the ten-key 102, as well as the single-action and abbreviated dialing operations, cannot be performed. Therefore, such a facsimile cannot realize facsimile transmission and further conversation. There is also a need to improve this disadvantage of such a facsimile.

The object of the present invention, proposed in response to such background is to provide a facsimile transmitting and receiving apparatus having improved operability during the dialing operation by connecting with a telephone set that provides the single-action and abbreviated dialing function, and which enables conversation even when a power failure occurs by connecting with the telephone set which operates with the power supply voltage supplied from the telephone line.

SUMMARY OF THE INVENTION

The present invention proposed for attaining the object explained above may include a facsimile unit having no single-action or abbreviated dialing function connected to a telephone set which provides an automatic dialing means for transmitting a dial signal by a single-action dialing or abbreviated dialing operation and a signal processor for automatically outputting a selection control signal for executing facsimile transmission after call originating operation, and which may operate with a power supply voltage supplied through a telephone line.

The facsimile transmitting and receiving apparatus of the present invention is capable of employing the composition for separating the facsimile unit and telephone set and connecting them with a signal line or the composition for integrating them.

In accordance with a preferred embodiment of the present invention, when the single-action or abbreviated dialing operation is executed in the side of the telephone set, a dial signal is transmitted as the call originating signal from the automatic dialing means to the telephone line through the facsimile unit. When the dial signal is transmitted, a selection control signal is transmitted to the facsimile unit from the signal processor in the telephone set and the telephone line is selectively connected to the side of facsimile unit for the facsimile transmission. Moreover, since the electrical power is supplied to the telephone set from the telephone line, even if the power to be supplied to the facsimile unit is interrupted, origination of call and conversation can be realized by the single-action and abbreviated dialing operations.

DESCRIPTION OF PREFERRED EMBODIMENT

A preferred embodiment of the present invention will be explained with reference to the accompanying drawings.

Figure 1:
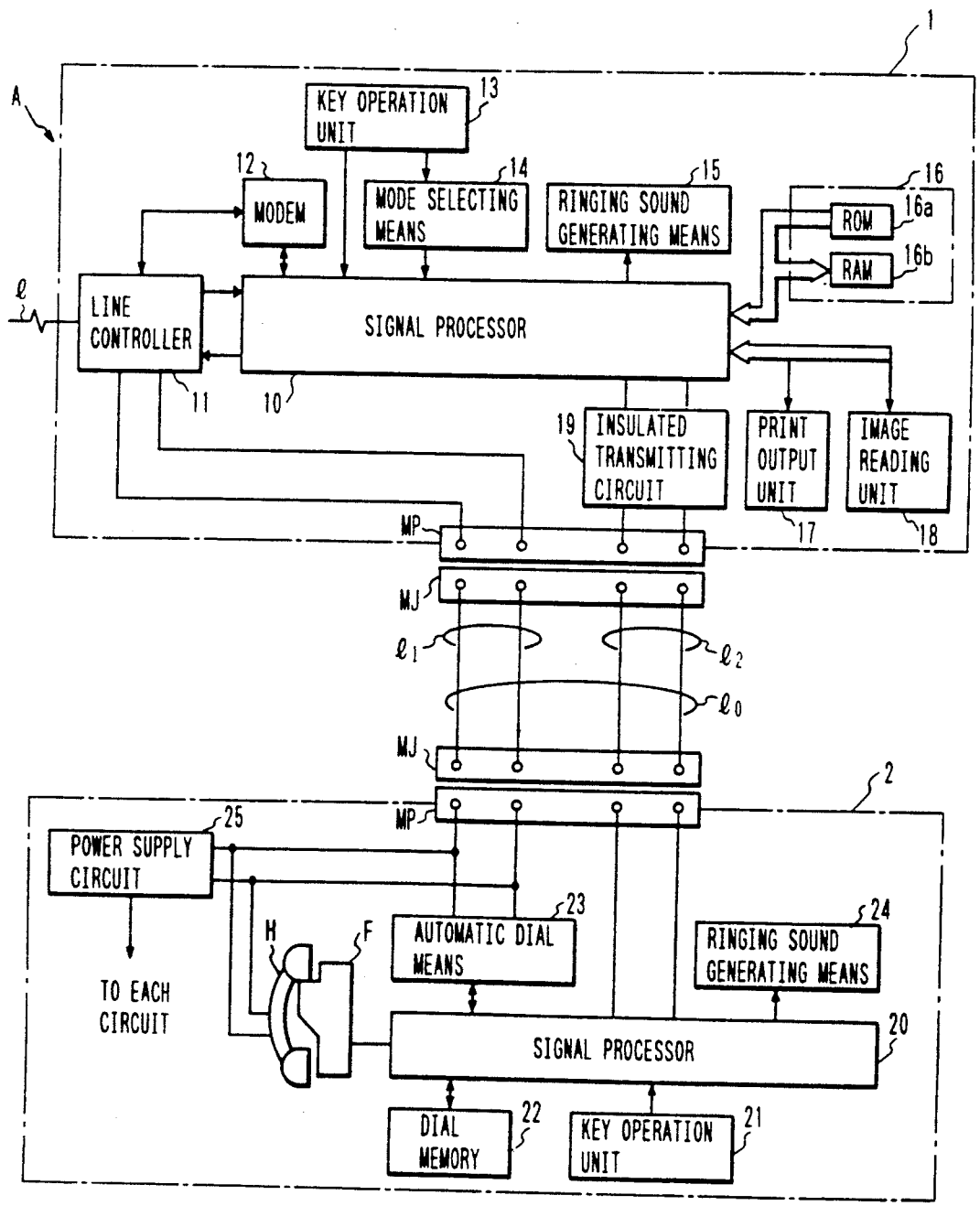
FIG. 1 shows an example of block diagram of a facsimile transmitting and receiving apparatus of the present invention.

FIG. 1 shows an example of the composition of a facsimile transmitting and receiving apparatus in accordance with the present invention. The reference numeral, 1 denotes a facsimile unit; 2, a telephone set. The facsimile unit and telephone set are connected with signal line $l_0$ consisting of the signal lines $l_1$, $l_2$ In the facsimile unit 1, numeral 11 denotes a line controller for selectively connecting the telephone line 1 to the side of telephone set 2 and facsimile (modem); 12, a modem for transmitting and receiving image signal through the telephone line 1; 13, a key operation unit having various operation keys (not illustrated); 14, a mode selecting means for selectively setting the side of facsimile unit 1 to the telephone mode and facsimile mode as will be explained later; 15, a ringing sound generating means for outputting the ringing sound when the ringing signal is transmitted through the telephone line 1. Additionally, numeral 17 denotes a memory having ROM 16$a$ and RAM 16$b$; 17, a print output unit for printing image signal received by the modem 12 on the recording sheet (not illustrated); 18, an image reading unit for reading a transmitting document (not illustrated) and then converting such data into image signal; 19, an insulating transmitting circuit for insulating transmission of the selective control signal transmitted from the telephone set 2. The signal processor 10 controls the various circuits explained heretofore. The insulated transmitting circuit 19 is provided for separating the telephone line from the facsimiles power supply system. In a preferred embodiment, a photocoupler is used as this insulating transmitting circuit 19.

In the telephone set 2, reference numeral 21 denotes a key operation unit having various keys such as the single-action and abbreviated dial keys; 22, a dial memory for storing telephone numbers corresponding to single-action key and abbreviated dial key, etc.; 23, an automatic dial means for transmitting the dial signal of telephone numbers stored in the dial memory 22 to the telephone line through the facsimile unit 1 and the signal line $l_1$; 24, a ringing sound generating means for outputting the ringing sound when the ringing signal is transmitted through the signal line $l_1$; 25, a power supply circuit for supplying a power supply voltage supplied from the telephone line 1 through the signal line $l_1$ to the telephone set 2 as a stabilized DC voltage. These circuits are controlled in the signal processor 20. H means a handset and F means a handset holder.

Figure 2:
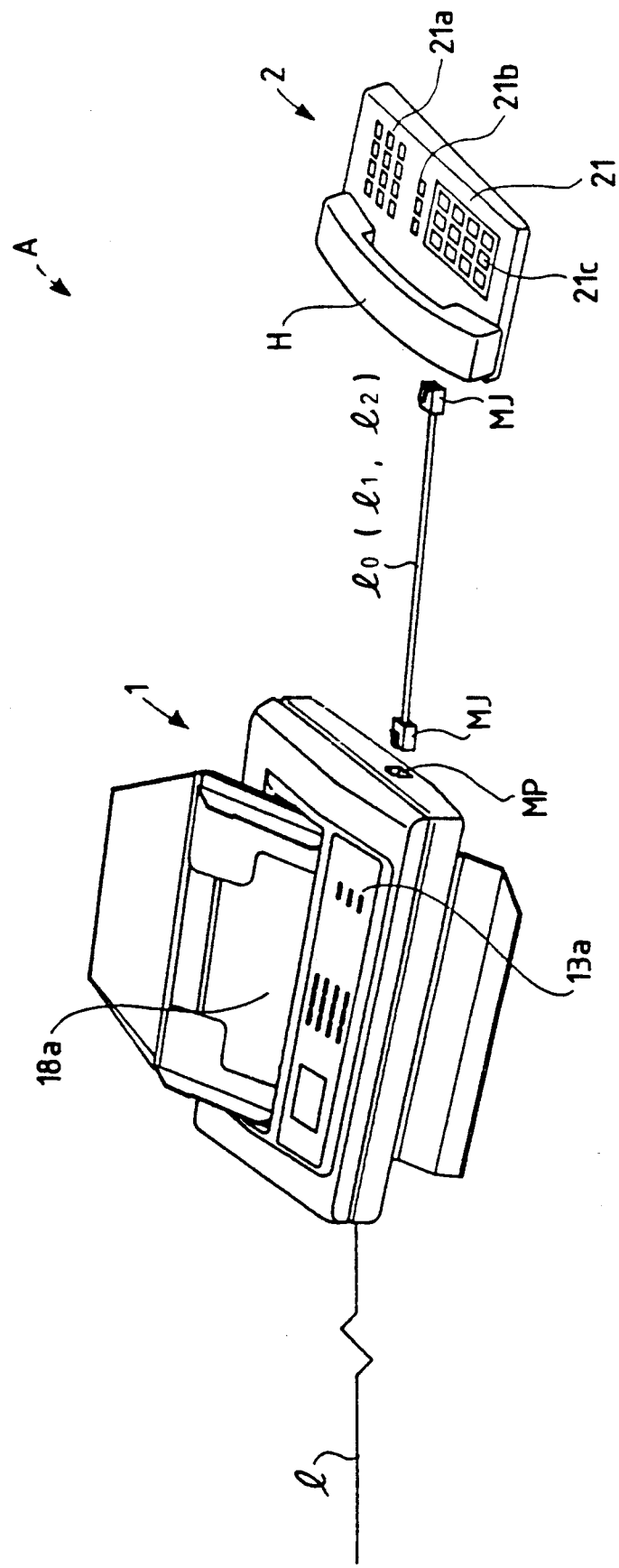
FIG. 2 is a perspective view indicating appearance of the same apparatus.

FIG. 2 illustrates one example of the appearance of the facsimile transmitting and receiving apparatus A. The key operation unit 21 of telephone set 2 may be provided with a single-action dial key 21a, an abbreviated dial key 21b and a ten-key 21c. The telephone set 2 and facsimile unit 1 may be connected through a signal line $l_0$ having modular jacks at both ends thereof. The facsimile unit 1 may be further provided with a document setter 18a for setting a transmitting document.

Figure 3:
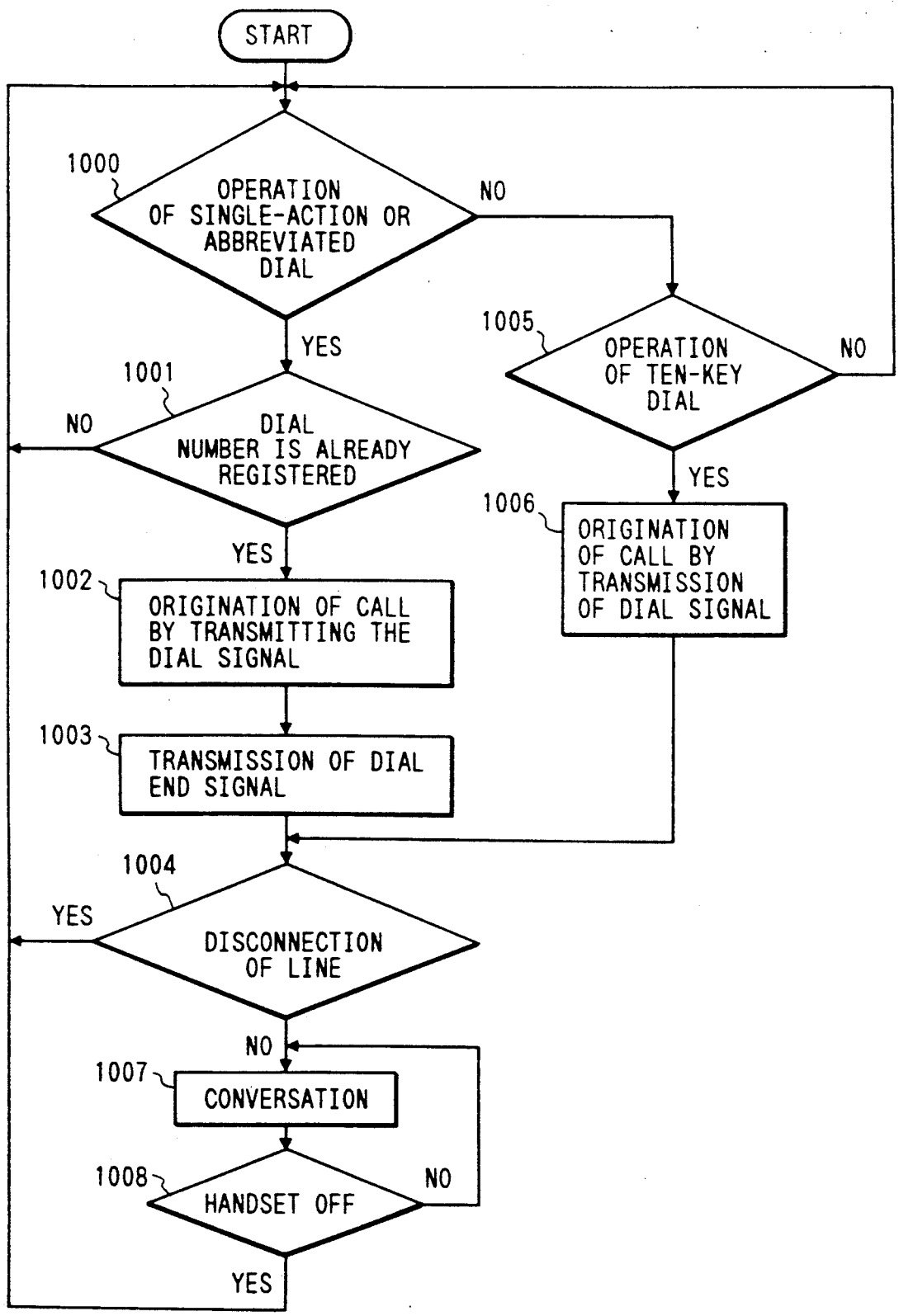
FIG. 3 is a flowchart for explaining operation of the telephone set.
Figure 4:
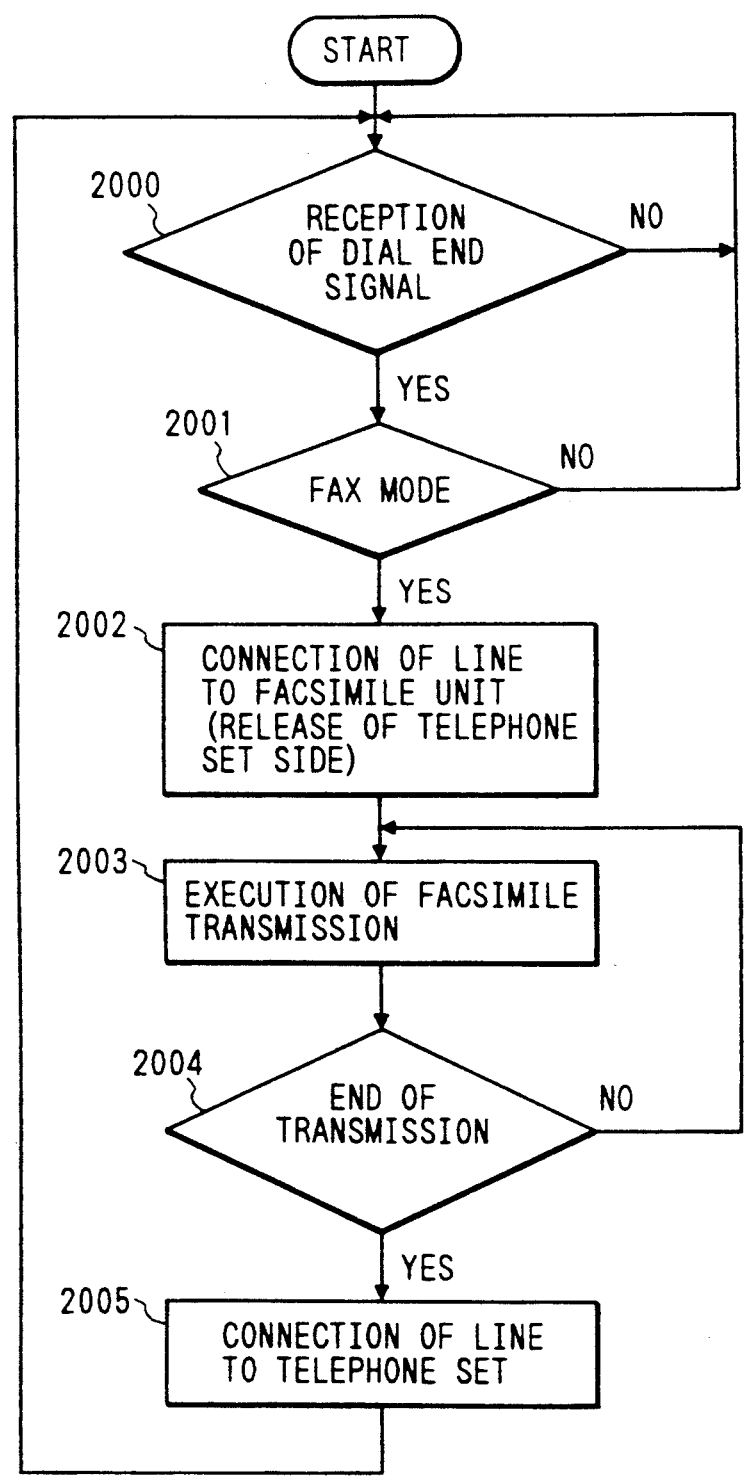
FIG. 4 is a flowchart for explaining operation of the facsimile unit.
Figure 5:
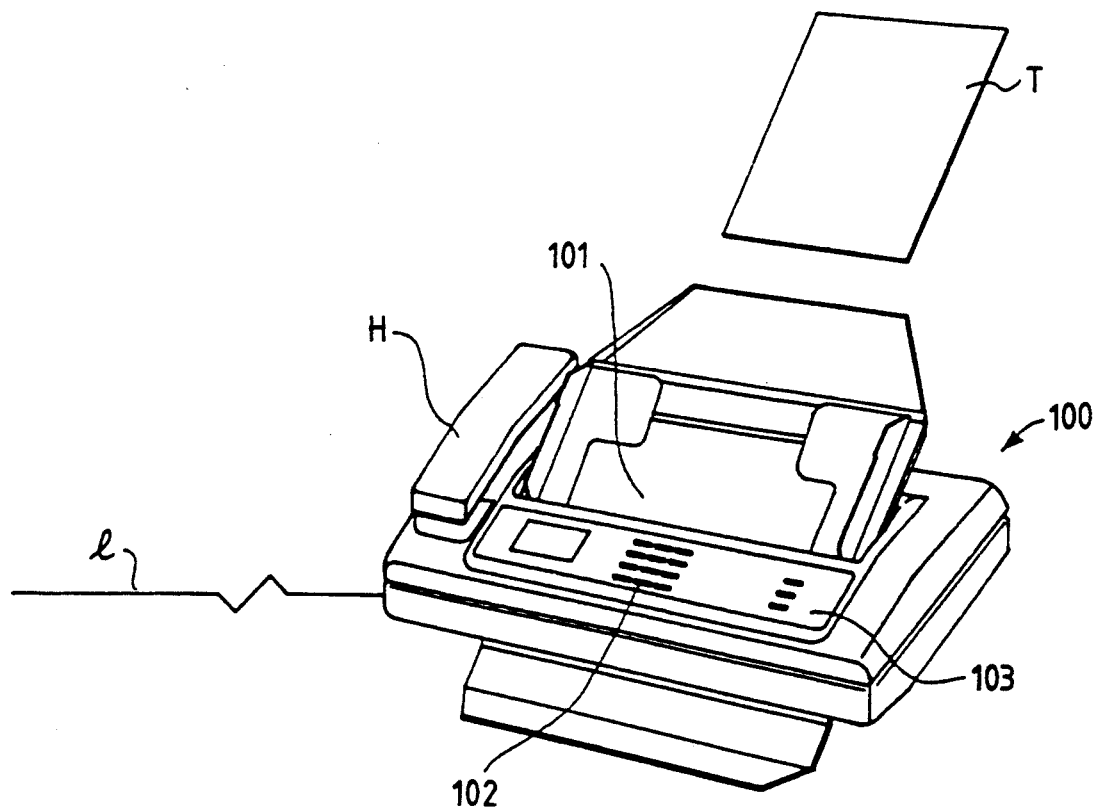
FIG. 5 is a perspective view indicating appearance of the conventional facsimile transmitting and receiving apparatus.
Figure 6:
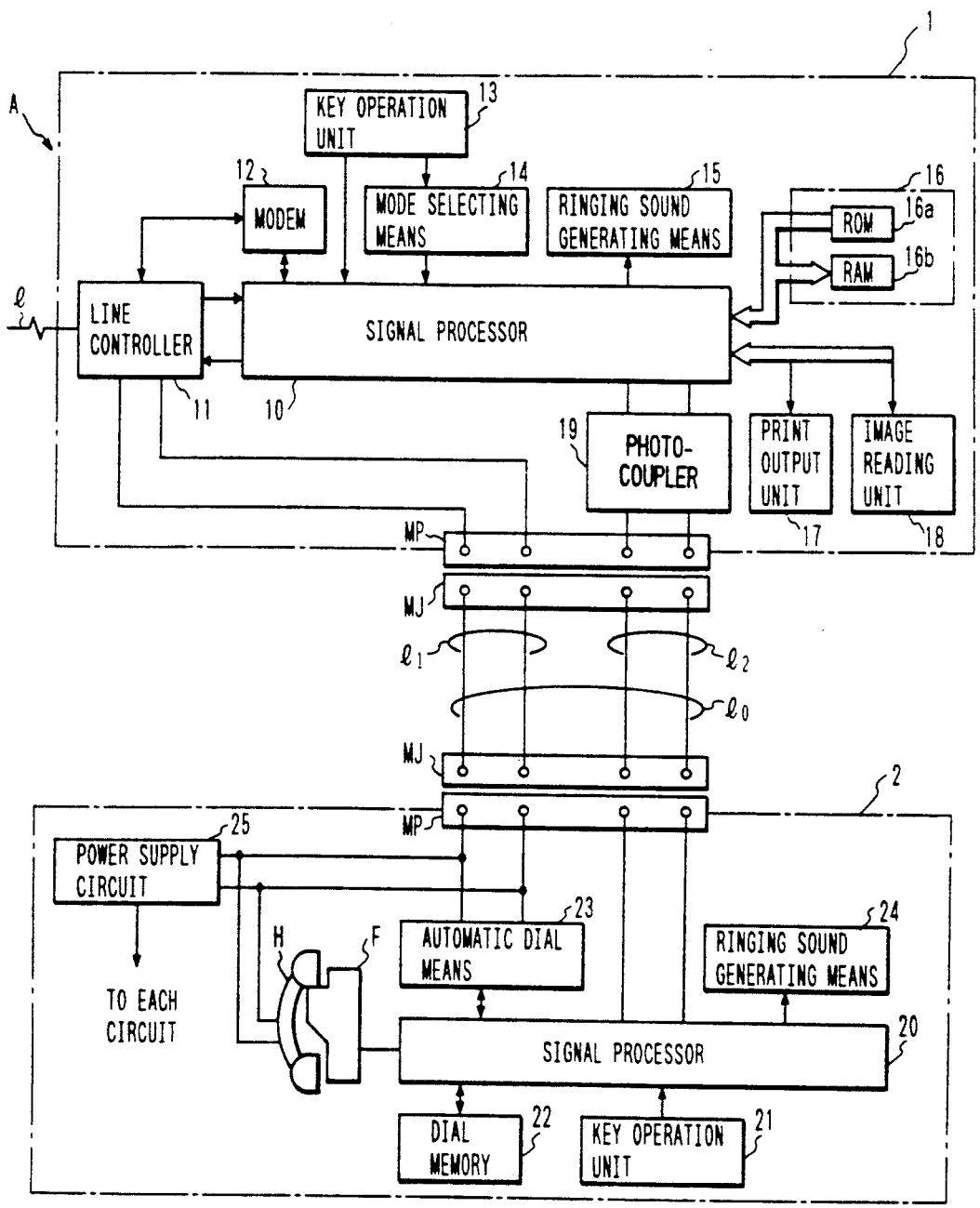
FIG. 6 is a block diagram illustrating a preferred embodiment of the present invention.

The facsimile transmitting operation of the facsimile transmitting and receiving apparatus A of the present invention having such composition will then be explained with reference to the flowcharts of FIG. 3 and FIG. 4.

1. Operations when the facsimile 1 is set to the FAX mode (Refer to FIG. 3 and FIG. 4)

① When the handset H of telephone set 2 is lifted and dial operation is made by inputting the abbreviated telephone number of two digits with the ten-key 21c after operating the abbreviated key 21b, the signal processor 20 transmits a dial signal, if the dial number corresponding to the operated key is registered, to the facsimile unit 1 from the automatic dial means 23 through the signal line $l_1$. The facsimile unit 1 transmits the dial signal to the telephone line 1 through the line controller 11 (refer to steps 1000–1002 of FIG. 3).

② Upon completion of transmission of the dial signal, the signal processor 20 transmits a dial end signal to the facsimile unit 1 through the signal line $l_2$ and the facsimile unit 1 receives the transmitted dial end signal by the signal processor 10 through the insulating transmitting circuit 19 and selectively connects the telephone line 1 to the side of modem 12 with the line controller 11. Thereby, the line in the side of telephone set 2 is disconnected (refer to steps 1003, 1004 of FIG. 3).

On the other hand, the facsimile 1 operates as follow.

① When the dial end signal is transmitted from the telephone set 2 through the signal line $l_2$, the signal processor 10 connects, only when it is set to the FAX mode, the telephone line 1 to the side of modem 12 by transmitting a control signal to the line controller 11 and transmits the image signal to the telephone line 1, when a call is terminated to the called party, by reading a transmitting document set in the document setter 18a with the image reading unit 18. Upon completion of transmission, the line controller 11 connects again the telephone line 1 to the side of telephone set 2, returning to the waiting condition (refer to steps 2000–2005 of FIG. 4).

2. Operation when the facsimile 1 is set to the telephone mode (refer to FIG. 3 and FIG. 4)

① When the handset H of telephone set 2 is lifted and dial operation is made by inputting the abbreviated telephone number of two digits with the ten-key 21c after operating the abbreviated key 21b, the signal processor 20 transmits the dial signal, if the dial number corresponding to the operated key is registered, transmits the dial signal to the facsimile unit 1 from the automatic dial means 23 through the signal line $l_1$. The facsimile unit 1 transmits the dial signal to the telephone line 1 through the line controller 11 (refer to steps 1000–1002 of FIG. 3).

② Upon completion of transmission of the dial signal, the signal processor 20 transmits the dial end signal to the side of facsimile 1 through the signal line $l_2$ and the facsimile unit 1 receives the transmitted dial end signal with the signal processor 10 through the insulating transmitting circuit 19. However, since the facsimile 1 is set to the telephone mode, the telephone line 1 is continuously connected to the telephone set 2. When a call is terminated to the called party, conversation can be made with the handset H (refer to steps 1003, 1004, 1007 of FIG. 3).

③ When the conversation ends and the handset H is turned OFF (placed on the telephone set), the facsimile enters the waiting condition.

3. Operation when the dial operation is executed by the ten-key (refer to FIG. 3)

When the telephone number of a called party is dialed with the ten-key 21c, the dial signal is transmitted to the side of facsimile 1 for origination of call. In this case, however, since the dial end signal is not outputted, the line in the side of telephone set 2 is disconnected only when the start key 13a on the facsimile unit 1 is depressed and transmission of facsimile signal is executed. But, when the start key 13a is not depressed, conversation can be made with the handset H (refer to steps 1000, 1004–1008 of FIG. 3).

4. Operation when supply of power to the facsimile unit 1 stops:

When supply of power to the facsimile unit 1 stops, facsimile transmission is disabled but since the telephone line 1 is connected to the telephone set 2 through the signal line $l_1$ by the line controller 11, the electrical power is supplied to each internal circuit of the telephone set 2 and conversation can be made with the single-action dial or abbreviated dial operation.

As explained, dial operation can be made easily only by connecting the telephone set having the single-action or abbreviated dial functions to the facsimile unit and moreover conversation can also be executed even when the supply of power to the facsimile unit stops.

As illustrated by above explanation, the facsimile transmitting and receiving apparatus of the present device improves operationability since dial operation can easily be executed utilizing the single-action dial and abbreviated dial function of the telephone set at the time of facsimile transmission and conversation can be executed with the telephone set even when supply of power to the facsimile unit stops.

What is claimed is:

1. A facsimile apparatus, comprising:
    a telephone set including automatic dialing means for transmitting a dial signal in response to one of a single-action dialing operation and an abbreviated dialing operation, and telephone set control means or producing a dial end signal in response to a completion of a transmission of the dial signal, a facsimile unit adapted to be operably connected to a telephone line, the facsimile unit including mode selecting means for selecting one of a facsimile mode and a telephone mode, and facsimile unit control means for switching the apparatus into a mode selected by the mode selecting means in response to a reception of the dial end signal from the telephone set control means, and connecting means for operably connecting the facsimile unit and the telephone set, wherein the telephone set receives a power supply voltage from the telephone line.

2. The facsimile apparatus of claim 1, wherein the connecting means comprises a first signal line and a second signal line, the power supply voltage being supplied form the facsimile unit to the telephone set through the first signal line, and the dial end signal being supplied from the telephone set to the facsimile unit through the second signal line.

3. The facsimile apparatus of claim 2, wherein the facsimile unit includes an insulating transmitting circuit operably connected to the second signal line such that the telephone set control means and the facsimile unit control means are separated.

4. The facsimile apparatus of claim 3, wherein the insulating transmitting circuit comprises a photocoupler.

5. The facsimile apparatus of claim 1, wherein the facsimile unit has no single-action or abbreviated dialing function.

* * * * *